(12) United States Patent
Flanigan-Davis

(10) Patent No.: US 10,308,189 B2
(45) Date of Patent: Jun. 4, 2019

(54) VEHICLE ATTACHED WALLET

(71) Applicant: Vivian Flanigan-Davis, Cincinnati, OH (US)

(72) Inventor: Vivian Flanigan-Davis, Cincinnati, OH (US)

(*) Notice: Subject to any disclaimer, the term of this patent is extended or adjusted under 35 U.S.C. 154(b) by 0 days.

(21) Appl. No.: 15/791,556

(22) Filed: Oct. 24, 2017

(65) Prior Publication Data
US 2019/0118723 A1 Apr. 25, 2019

(51) Int. Cl.
B60R 7/04 (2006.01)
B60R 7/08 (2006.01)

(52) U.S. Cl.
CPC ............... B60R 7/087 (2013.01); B60R 7/04 (2013.01)

(58) Field of Classification Search
CPC ........ B60N 3/007; B60N 2/783; B60R 7/087; B60R 7/04; B60R 2011/004; B60R 11/00; B60R 13/10
USPC ............ 224/277, 482–483, 655, 236; 40/643
See application file for complete search history.

(56) References Cited

U.S. PATENT DOCUMENTS

| 1,558,213 | A | * | 10/1925 | Atkins | A45C 11/24 150/147 |
| 3,994,328 | A | * | 11/1976 | Reis | A45C 1/08 150/143 |
| 4,705,086 | A | * | 11/1987 | O'Neill | A45C 1/04 150/134 |
| 5,439,153 | A | * | 8/1995 | Murdoch | A45C 13/002 150/159 |

* cited by examiner

Primary Examiner — Adam J Waggenspack
(74) Attorney, Agent, or Firm — Daniel M. Cohn; Howard M. Cohn

(57) ABSTRACT

A vehicle attached wallet to keep a plurality of cards in a convenient location within a vehicle. A housing body for storing the cards, formed of a single, integral sheet of material. The integral sheet of material is folded at the center section of the sheet of material between first and second outer ends of the sheet of material to form a first rectangular shaped side wall and a second rectangular shaped side wall. Side edges of the first side wall and the side edges of the second side wall are aligned and attached to each other. An opening extends between the first and second outer ends to provide access to an otherwise closed interior cavity defined by the first side wall, the second side wall and the side edges. A Velcro strip is secured to a first side wall of the housing body.

11 Claims, 5 Drawing Sheets

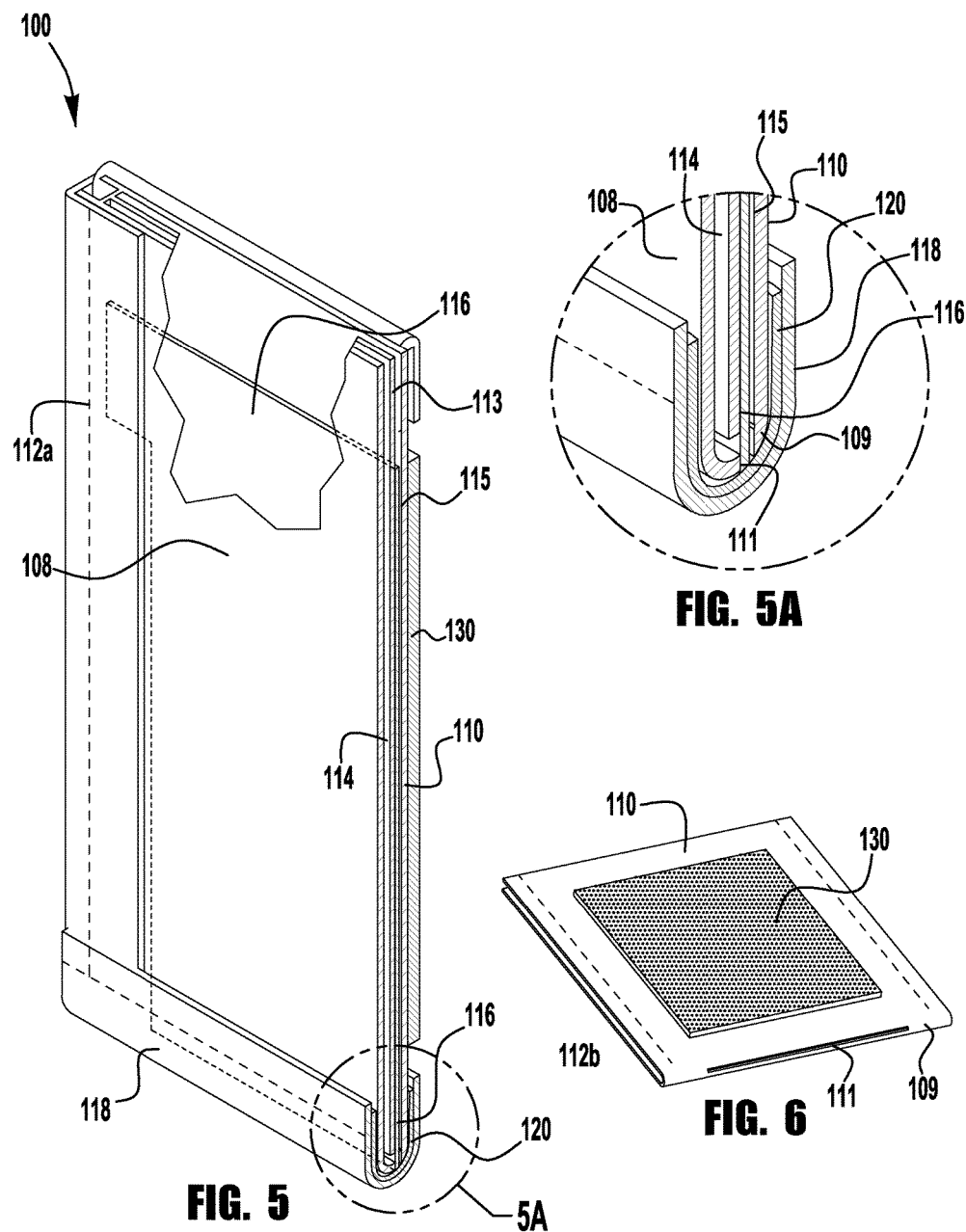

VEHICLE ATTACHED WALLET

TECHNICAL FIELD OF THE INVENTION

The present invention relates to a vehicle attached wallet, and more particularly to a vehicle attached wallet to keep a plurality of cards in a convenient location within a vehicle within easy reach of a driver of the vehicle

BACKGROUND OF THE INVENTION

In recent years, credit cards and the like have become most popular and are used for nearly every type of purchase and transaction. Credit cards have almost supplanted cash. Further, personal identification cards, as well as various licenses are widely carried. Most business cards, driving licenses and other such documents have adopted the same format as the standard credit card. There are numerous devices designed to store and protect cards of the credit card type, and there are lots of considerations that need to be addressed to ensure ideal storage of these cards. The traditional style of wallet was designed to hold currency, namely a plurality of bills. However, these traditional wallets provides a very inefficient arrangement for these credit card-sized documents that leads to a very bulky package which tends to form unsightly and uncomfortable bulges in the jacket or pants pockets of their owners.

Most credit card holders on the market today are a paper or plastic sleeve that holds one or two credit cards (for purposes of this specification, the term "credit cards" also includes debit cards, charge cards, and the like). Some conventional leather billfolds are also made with slots for holding credit cards.

SUMMARY OF THE INVENTION

According to an embodiment of the present invention, there is disclosed a vehicle attached wallet to keep a plurality of cards in a convenient location within a vehicle within easy reach of a driver of the vehicle. The vehicle attached wallet includes a housing body for storing the plurality of cards, formed of a single, integral sheet of material. The integral sheet of material is folded at the center section of the sheet of material between first and second outer ends of the sheet of material to form a first rectangular shaped side wall and a second rectangular shaped side wall. Side edges of the first side wall and the side edges of the second side wall are aligned and attached to each other. An opening extends between the first and second outer ends to provide access to an otherwise closed interior cavity defined by the first side wall, the second side wall and the side edges of the first side wall and the side edges of the second side wall. Finally, a hook and loop fastener such as Velcro® strip is secured to a first side wall of the housing body.

According to another embodiment of the present invention, there is disclosed a vehicle attached wallet to keep a plurality of cards in a convenient location within a vehicle within easy reach of a driver. The vehicle attached wallet includes a housing body for storing the plurality of cards, formed of a single, integral sheet of material. The integral sheet of material is folded at a center section between first and second outer ends of the sheet of material to form a first rectangular shaped side wall and a second rectangular shaped side wall. Side edges of the first side wall and side edges of the second side wall are aligned and attached to each other. An opening extends between the first and second outer ends to provide access to an otherwise closed interior cavity defined by the first side wall, the second side wall and the side edges of the first side wall and the side edges of the second side wall. A hook and loop fastener such as Velcro® strip is secured to a first side wall of the housing body. A sheet is disposed between the first side wall and the second side wall forming first and second chambers within the housing body. The integral sheet of material is folded at a center section, the center section having a slit there through in communication with the second chamber. Finally, a flexible, bendable plastic sheet is disposed in the second chamber adapted to being pulled through the slit and folded over to cover the hook and loop fastener such as Velcro® strip.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

FIG. 5 is a front, three dimensional, cross-sectional view of an alternative embodiment of the vehicle attached wallet, in accordance with the present invention.

FIG. 5A is a view of the circular section of FIG. 5, in accordance with the present invention.

FIG. 6 is a front, three dimensional, view of a portion of the vehicle attached wallet, in accordance with the present invention.

DETAILED DESCRIPTION OF THE PREFERRED EMBODIMENTS

Figure 1:
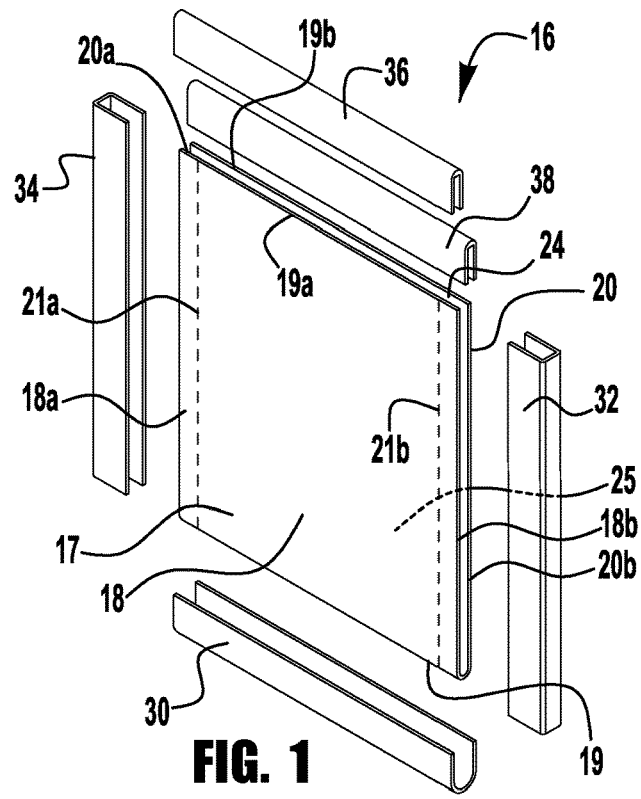
FIG. 1 is a front, three dimensional, exploded view of the vehicle attached wallet, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The use of credit cards, smart cards, identification cards, ATM cards and the like (collectively hereinafter referred to as "cards" or "credit cards") has been increasing rapidly in society over the last several years. Most people now find that they carry less cash and more cards. The vehicle attached wallet 10 relates to a simple method of keeping such varied cards 12 such as credit cards, identification cards, drivers licenses, and membership cards in a convenient location with a vehicle 14. Using vehicle attached wallet 10 permits a person to carry a large number of cards 12 in a case from which any individual card can be easily extracted without removing the entire contents of the case, and at the same time the remaining cards are firmly and conveniently within the vehicle 14. After a card 12 is withdrawn and used, it is a simple matter to reinsert that card into the wallet 10 with little effort.

Heretofore, the use of such cards 12, especially a drivers license or concealed carry license, has been rather bothersome to the vehicle operator, as he had to reach in his pocket to remove his wallet to get the desired card. Therefore, the vehicle attached wallet 10 provides a simple and convenient means of holding cards 12 within easy reach of the driver, such that the cards may be retrieved with a minimum amount of effort. If is an object of the vehicle attached wallet 10 to provide a novel device for holding cards 12 within easy reach of the driver for convenient storage and retrieval, as desired.

The vehicle attached wallet 10 typically is constructed of a housing body 16 for a plurality of credit and identification cards and licenses. The housing body 16 is preferably formed of single, integral sheet 17 of material that is generally rectangularly configured, although any appropriate shape may be utilized. In general, the integral sheet 17 is folded at the center section 19 of the integral sheet of material 17 between the outer ends 19a and 19b to form a first, rectangular shaped side wall 18 and a second, rectangular shaped side wall 20. The side edges 18a and 18b of the first side 18 and the side edges 20a and 20b of the second side are aligned and can attached to each other by any means such as stitching 21a extending adjacent the side edges 18a and 20a and stitching 21b extending adjacent the side edges 18b and 20b. An opening 24 extends between the outer ends 19a and 19b and provides access to an otherwise closed interior cavity 25 defined by the first side wall 18, the second side wall 20 and the stitching 21a and 21b.

Figure 2:
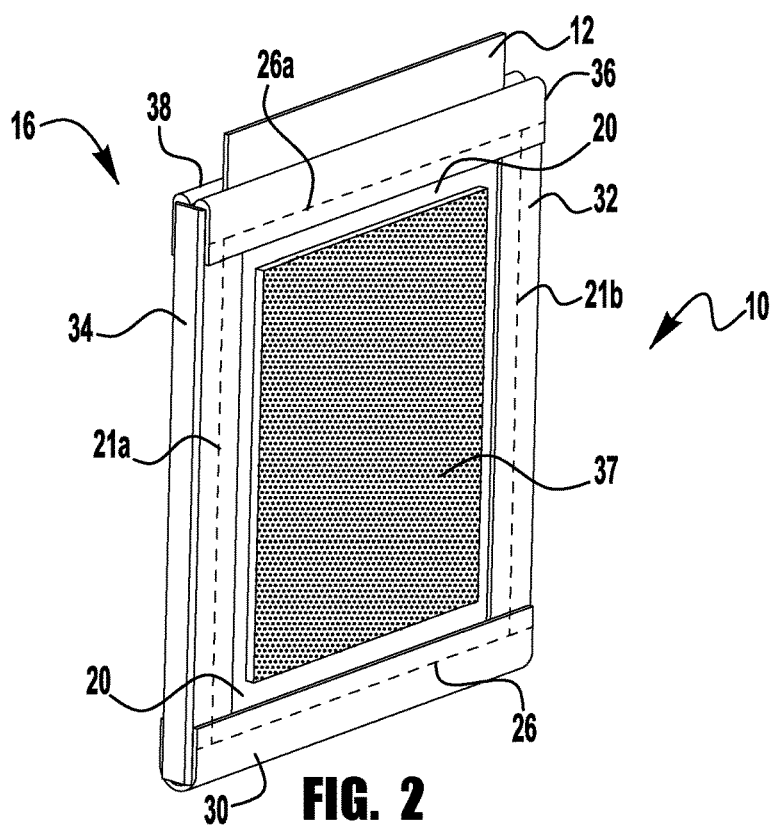
FIG. 2 is a rear, three dimensional view of the vehicle attached wallet, in accordance with the present invention.

As shown in FIGS. 1 and 2, a bottom strip of trim 30 is folded and placed on the folded center section 19 and sewn into place with the stitching 26. First and second side strips 32 and 34 are folded and placed on the side edges 18a and 18b of the first side 18 and the side edges 20a and 20b of the second side 20 and sewn into place with the stitching 21a and 21b. First and second top strips 36 and 38 are folded and placed on the outer ends 19a and 19b, respectively, and sewn into place with the stitching 26a to provide an opening into the interior cavity 25.

As shown in FIG. 2, a hook and loop fastener such as Velcro® strip 37 is attached to the second rectangular shaped side 20.

The housing body 16 has two longer, rectangular shaped side walls 18 and 20, folded center section 19 and two outer ends 19a and 19b. Typically, "wallet-size cards" are approximately 8.5 cm long by 5.5 cm wide and up to 1.5 mm thick. Therefore, the housing 16 must be made to dimensions that are suitable for carrying cards of other dimensions as well. For example, the longer side walls 18 and 20 may have a length with a range between 3 inches and 10 inches, and the outer ends 19a and 19b may have a length with a range between 2 inches and 10 inches.

As seen in FIG. 2, one or more rectangular shaped credit, business and/or identification cards 12 with their longer sides running parallel to the longer side walls 18a and 18b of the housing body 16, and perpendicular to the two end walls 19a and 19b, can be housed within the interior cavity 25. The end walls 19a and 19b form a partial or full opening 24 to allow insertion of the cards 12 into the cavity 25. It is within the terms of the embodiment that there be a fabric liner insert (not shown) or other means of separation additionally provided between the credit and business identification cards and the side wall 20 of the housing body 16 to form a cavity capable of receiving currency bills.

The housing body 16 ideally includes means for temporarily closing the opening 24. Preferably, a two-component fastening system is used to temporarily secure the opening 24 such as, for example, by a standard hook-and-loop hook and loop fastener such as Velcro® adhesive arrangement or by a zip-lock connection, or zipper, or flap. For example, there may be a Zipper strip securing the first and second top strips 36 and 38 forming the opening 24 to easily open and close the opening to secure the contents of the cavity 25 therein.

FIG. 2 illustrates a view of the rear of the housing body 16. There is a hook and loop fastener such as Velcro® strip 37 secured to the side wall 20 of the housing body 16, by any desirable means, preferably an adhesive. It is further within the terms of the present embodiment that the hook and loop fastener such as Velcro® strip 37 be integrally formed with the side wall 20. The hook and loop fastener such as Velcro® strip 37 may either be the "hook" or "loop" section of hook and loop fastener such as Velcro®, and is received by a corresponding hook and loop fastener such as Velcro® strip 39 disposed within the vehicle 14, as further described below.

Figure 3:
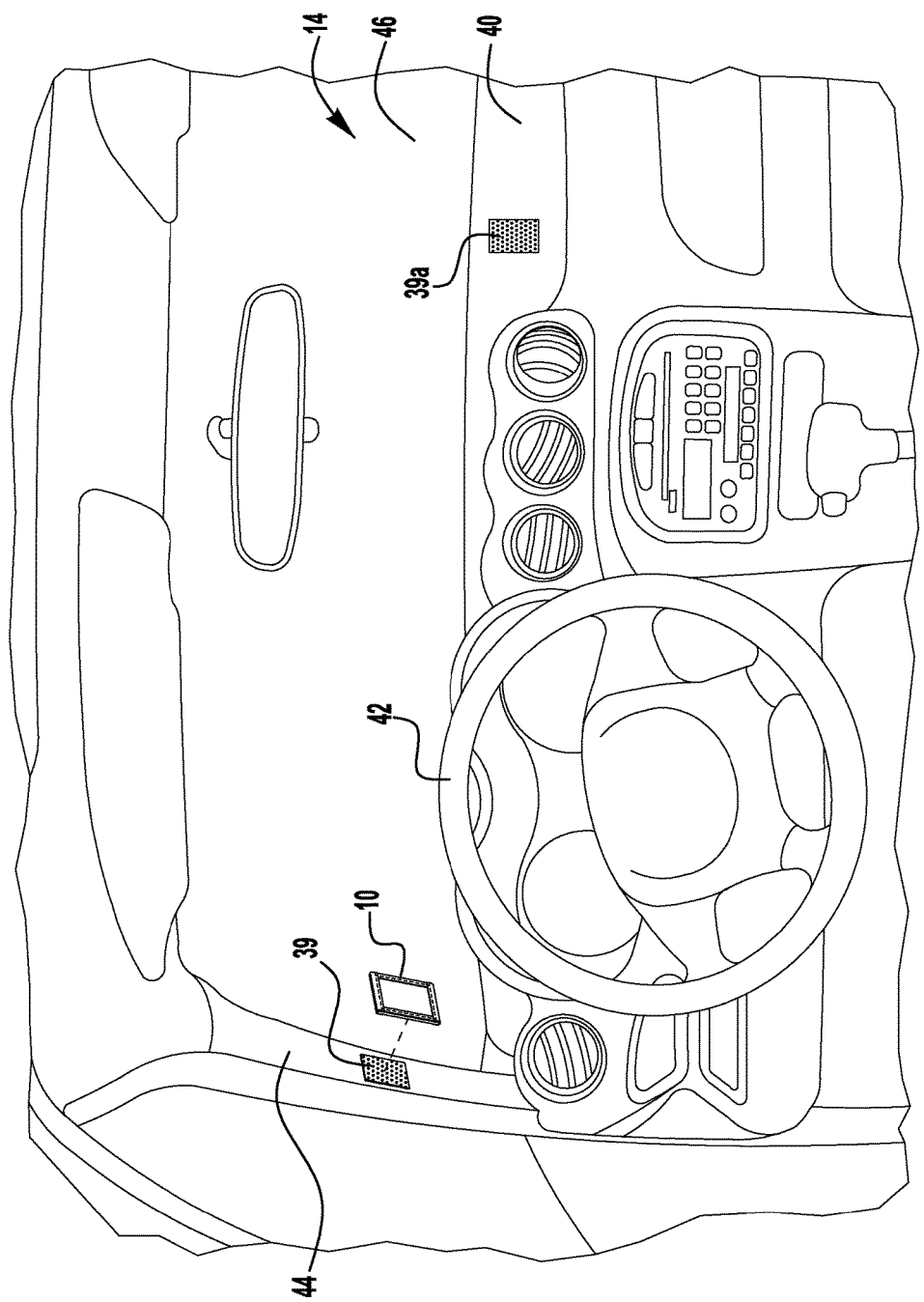
FIG. 3 is a front three dimensional view of the vehicle attached wallet in use in a vehicle, whereby two hook and loop fastener such as Velcro® strips are available to be utilized by the driver, in accordance with the present invention.

FIG. 3 illustrates a vehicle 14 having dashboard 40 and steering wheel 42 The housing body 16 of the vehicle attached wallet 10 is designed to be attached to one of the hook and loop fastener such as Velcro® strips 39 or 39a. As shown, there is a first hook and loop fastener such as Velcro® strip 39 disposed on column 44, and another strip 39a on the dashboard 40, but there may be any number of hook and loop fastener such as Velcro® strips located in any desirable location. It must also be noted that any desired mounting mechanism may be employed to removably secure the vehicle attached wallet 10 to the vehicle 14. For example, there may be a clip (not shown) on the side wall 20 of the body 16 of the vehicle attached wallet 10 which corresponds to a receiving slot (not shown) disposed within the vehicle 14 to allow the vehicle attached wallet to be temporarily secured thereto.

As illustrated, the vehicle attached wallet 10 is attached to the first hook and loop fastener such as Velcro® strip 39 disposed on column 40. As such, the vehicle attached wallet 10 is angled to parallel the windshield 46 of the vehicle 14. Any desired cards 12 located within the interior cavity 25 of the housing body 16 will be easily accessible by reaching over the steering wheel 42 and grasping the documents through the opening 24. For example, in the event that a police stops the car, the driver may reach into the housing body 16 to access his driver's license, and any other relevant information, such as a concealed carry license. When exiting the car, the driver may simply remove the vehicle attached wallet from the hook and loop fastener such as Velcro® strip 39 or 39a.

Figure 4:
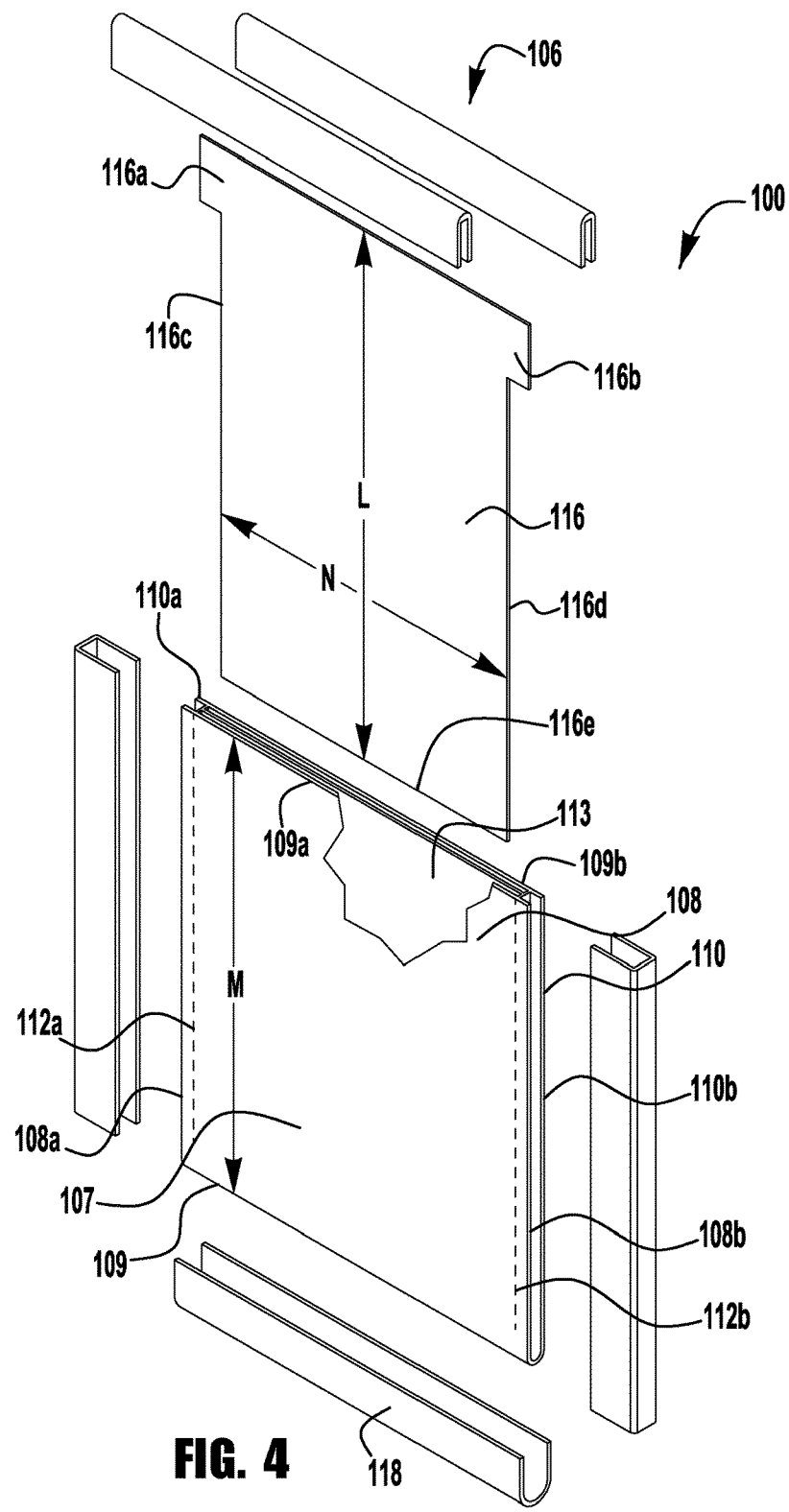
FIG. 4 is a front, three dimensional, exploded view of an alternative embodiment of the vehicle attached wallet, in accordance with the present invention.
Figure 7:
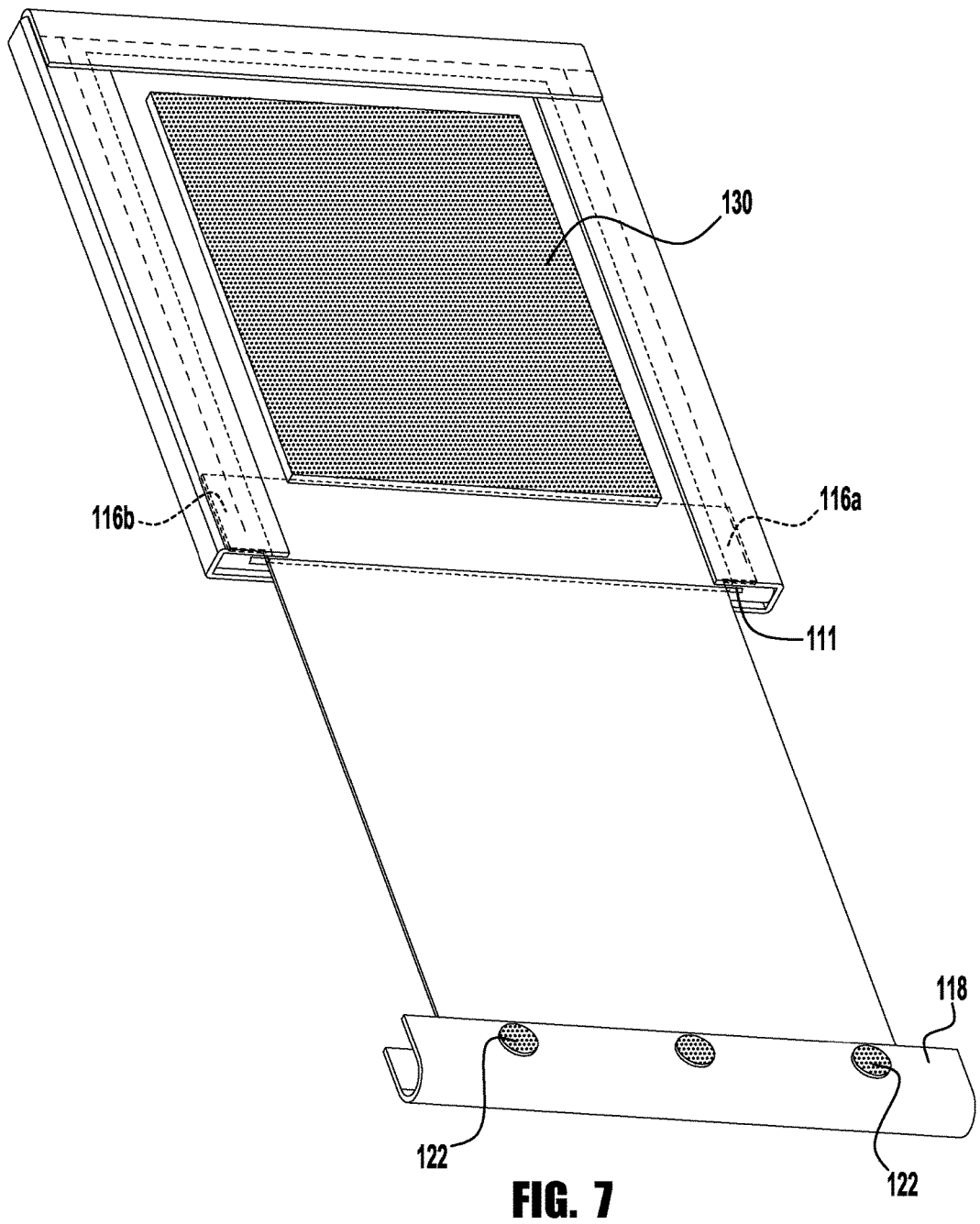
FIG. 7 is a front, three dimensional, view of an alternative embodiment of the vehicle attached wallet, in accordance with the present invention.

Referring to FIGS. 4 and 5, there is illustrated an alternative embodiment of an improved vehicle attached wallet 100 providing a simple and convenient means of holding cards (compare 12 in FIG. 2) within easy reach of the driver, such that the cards may be retrieved with a minimum amount of effort. The improved vehicle attached wallet 106 has a feature that allows the wallet to be comfortably carried in the users pocket.

The housing body 106 is preferably formed of single, integral sheet 107 of material that is generally configured as a rectangle, although any appropriate shape may be utilized. In general, the integral sheet 107 is folded at the center section 109 of the sheet of material 107 between the outer ends 109a and 109b to form a first rectangular shaped side wall 108 and a second rectangular shaped side wall 110. The side edges 108a and 108b of the first side wall 108 and the side edges 110a and 110b of the second side wall 110 are aligned and can attach to each other by any means such as stitching 112a extending adjacent the side edges 108a and 110a and stitching 112b extending adjacent the side edges 108b and 110b.

A sheet 113 of a material such as that used to form sheet 107 is disposed between the first side wall 108 and the second side wall 110 and can extend from the outer ends 109a and 109b of the integral sheet 107 towards the center section 109. It is within the terms of the present invention for the sheet 113 to extend the distance from the outer ends 109a and 109b of the integral sheet 107 towards the center section 109 or at least partially between outer ends 109a and 109b of the integral sheet 107 towards the center section 109.

The sheet 113 forms two chambers 114 and 115 between first side wall 108 and the second side wall 110. First chamber 114 is adapted to receive one or more rectangular shaped credit, business and identification in the manner previously described and shown in FIG. 2. Along the center section 109 is a slit 111, as shown in FIG. 6.

Second chamber 115 receives a flexible, bendable plastic sheet 116, such as for example a PVC or vinyl sheet, having a length L less than the length M of the first side and second side walls 108 and 110. The width N of the plastic sheet 116 is less than the length of the slit 111. The plastic sheet 116 has two shoulders 116a and 116b which project from the sides 116c and 116d. which are no wider than the distance between the stitching 112a and 112b so that the plastic sheet 116 can move up and down within the second chamber 115. The end 116e of the plastic sheet 116 extends through the slot 111 and is secured to the bottom strip 118 of trim, as shown in FIGS. 5 and 5A, by any desired means such as an adhesive. The bottom strip 118 of trim is folded and placed on the folded center section 109 and secured thereto by any means such as one or more u-shaped, spring clamps 120 which can secured to the bottom strip so that the latter is removably secured to the folded center section 109. The bottom strip 118 can have one or more pieces 122 of hook and loop fastener such as Velcro® attached thereto.

In use, the plastic sheet 116 can be pulled from chamber 115 through the slit 111 by pulling on the bottom strip 118 of trim until the shoulders 116a and 116b are stopped by the sides of chamber 115 since the width N of the sheet 116 is slightly less than the width of the slit 111 and the shoulders 116a and 116b cannot fit through the slit. As shown in FIG. 6, a strip 130 of hook and loop fastener such as Velcro® can be mounted to a sidewall 110 for mounting the wallet to a corresponding hook and loop fastener such as Velcro® strip 32 disposed within the vehicle 14, as previously described.

When the user wants to remove the vehicle attached wallet 110 from the vehicle and carry it on the user's person, the hook and loop fastener such as Velcro® strip 130 can be covered so that it doesn't catch such as for example on the user's pocket or purse.

To cover the hook and loop fastener such as Velcro® strip 130, the plastic sheet 116 can be pulled through the slit 111 by pulling on the bottom strip 118 of trim until the shoulders 116a and 116b are stopped by the portion of the interior of the section 109. Then, the plastic sheet 116 can be folded over the section 109 and pulled over the side wall 110 and the hook and loop fastener such as Velcro® strip 130 so that the sheet 116 covers the hook and loop fastener such as Velcro® strip 130. The pieces 122 of hook and loop fastener such as Velcro® attached to the bottom strip 118 can engage the hook and loop fastener such as Velcro® strip 130 so that the hook and loop fastener such as Velcro® strip 130 remains covered by the plastic sheet 116. This enables the vehicle attached wallet 100 to be carried on the user's person, as described hereinbefore.

When the user wishes to put the wallet 16 back onto a piece of hook and loop fastener such as Velcro® in the car, as shown in FIG. 3, the sheet 116 is pulled off of the hook and loop fastener such as Velcro® strip 130 and pushed back into second chamber 115 with the bottom strip 118 and held in place by means such as by the u-shaped clamps 120 securing the bottom strip 118 to the sidewalls 108 and 110 once it rests against the folded center section 109.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A wallet attachable to a vehicle to keep a plurality of cards in a convenient location within a vehicle within easy reach of a driver, comprising:
   a housing body for storing the plurality of cards, formed of a single, integral sheet of material;

the integral sheet of material folded at a center section between first and second outer ends of the sheet of material to form a first rectangular shaped side wall and a second rectangular shaped side wall;

side edges of the first side wall and side edges of the second side wall being aligned and attached to each other;

an opening extending between the first and second outer ends to provide access to an otherwise closed interior cavity defined by the first side wall, the second side wall and the side edges of the first side wall and the side edges of the second side wall;

a hook and loop fastener strip secured to an exterior of the first side wall of the housing body to allow attachment to the vehicle;

a sheet disposed between the first side wall and the second side wall forming first and second chambers within the housing body;

the integral sheet of material folded at a center section, the center section having a slit there through in communication with the second chamber; and a flexible, bendable plastic sheet disposed in the second chamber adapted to be pulled through and extend from the slit and be folded over to cover the hook and loop fastener strip to allow the wallet to be placed into a user's pocket.

2. The vehicle attached wallet of claim 1, further including the sheet disposed between the first side wall and the second side wall extending a distance from the outer ends of the integral sheet towards the center section.

3. The vehicle attached wallet of claim 2, further including the sheet disposed between the first side wall and the second side wall extending a distance partially between the outer ends of the integral sheet towards the center section.

4. The vehicle attached wallet of claim 2, further including the sheet disposed between the first side wall and the second side wall forming first and second chambers between the first side wall and the second side wall, respectively.

5. The vehicle attached wallet of claim 4, further including:

the first chamber being adapted to receive plurality of cards; and the second chamber receiving the flexible, bendable plastic sheet having a length less than a length of the first side and second side walls, and a width less than a length of the slit.

6. The vehicle attached wallet of claim 5, further including the plastic sheet having:

two shoulders which project from two sides, respectively; and an end extending through the slit and secured to a bottom strip of trim, which is folded and placed on the center section and secured thereto.

7. The vehicle attached wallet of claim 6, further including the bottom strip having one or more pieces of hook and loop fastener attached thereto.

8. The vehicle attached wallet of claim 7, further including the plastic sheet extending from the second chamber through the slit such that the shoulders are stopped by a portion of the interior of the second chamber.

9. The vehicle attached wallet of claim 7, further including:

the plastic sheet having a width slightly less than the width of the slit; and the two shoulders being unable to fit through the slit.

10. The vehicle attached wallet of claim 9, further including the plastic sheet being bent and pulled back onto the hook and loop fastener strip so that the Velvet strip is covered.

11. The vehicle attached wallet of claim 10, further including the one or more pieces of hook and loop fastener attached to the bottom strip engaging the hook and loop fastener strip so that bottom strip is secured to the hook and loop fastener strip when the hook and loop fastener strip is covered by the plastic sheet.

* * * * *